United States Patent Office 2,755,105
Patented July 17, 1956

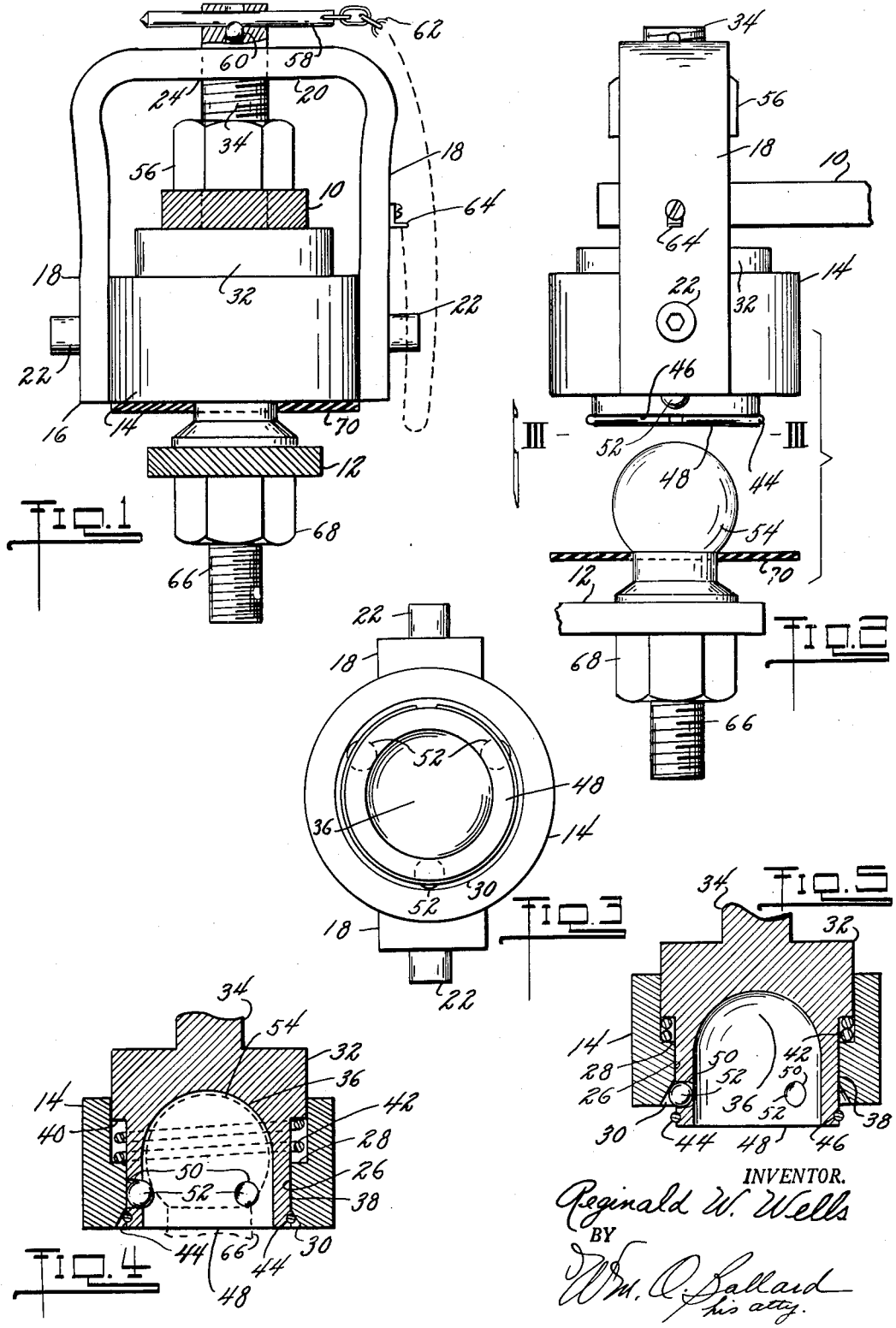

2,755,105

BALL AND SOCKET COUPLING MECHANISM FOR TRAILER

Reginald W. Wells, Erie, Pa., assignor to John V. Schultz and Carl E. Schultz, Erie, Pa.

Application March 1, 1954, Serial No. 413,186

8 Claims. (Cl. 280—513)

This invention relates to coupling devices, more particularly and popularly known as trailer hitches.

An object of this invention is to provide a pair of units, one of which may be fixed to a vehicle, and the other attached to another vehicle, which units may be readily locked together or unlocked at will normally without the use of any tool or tools.

Another object of this invention is to provide a low friction connection between two interlocking units.

Another object of this invention is to provide a low friction universal joint locking connection between two interlocking units.

And another object of this invention is to provide a coupling including a pair of interlocking units, each of which is of simple and inexpensive construction, and yet will provide a positive interlock embodying the more desirable features of a coupling, including low friction universal movement therebetween.

Other objects and advantages of this invention relating to the arrangement, operation and functions of the related elements of the structure, to various details of construction, to combination of parts and to economies of manufacture, will be apparent to those skilled in the art upon consideration of the following description and appended claims, reference being had to the accompanying drawings forming a part of this specification wherein like reference characters designate corresponding parts in the several views.

Referring to the drawings:

Fig. 1 is a side elevation of the coupling showing the parts connected and interlocked;

Fig. 2 is a view of the device, from right of Fig. 1, showing the parts disconnected;

Fig. 3 is a view on the line III—III, Fig. 2;

Fig. 4 is a partial longitudinal section through the device of Fig. 1; and

Fig. 5 is a view similar to Fig. 4 with the parts in open or released positions.

The device herein is primarily adapted as a trailer hitch, and when so used may be mounted on draw bars 10, 12, one of which is attached to and extending from the tractor or towing vehicle, and the other attached to and extending from the drawn or guided vehicle. The bar 10 may mount the locking or female unit, which unit includes a frame embodying a ring 14.

Yoke, or U-shaped frame element 16 is provided with a pair of legs 18, with an interconnecting web portion 20. The legs 18 are attached to diametrically opposed portions of the ring 14 by means of bolt-like elements 22. The web portion of the yoke is provided with a bearing aperture 24 therethrough spaced in axial alignment with the ring 14.

The ring 14 is provided with an inwardly extending peripheral portion 26 providing a circular seat 28 about the interior of the ring intermediate its length. The portion 26 extends from the seat 28 toward one end of the ring and, in approaching the same, is provided with an outwardly tapered extent 30 providing a camming face more particularly described hereinafter.

Reciprocably mounted in the ring 14 is an inverted cup-shaped element 32 coaxially positioned within the ring, and is provided with an integral stem 34 extending therefrom through the aperture 24. The bearings provided by the aperture 24 and the ring provide a substantial mounting for the cup 32, permitting only axial movement thereof.

The cup 32 has a spherical seat 36 therein and a reduced dimension section 38, providing a peripheral seat 40 about the cup which directly opposes the seat 28 when the cup 32 is mounted in the ring.

Compression spring 42 extends around the cup portion 38, exerting pressure between the seats 28, 40. This tends to move the cup upwardly in the ring, but the extent of such movement is limited by stop means 44, which means is in the form of a split ring inset in groove or seat 46 about and adjacent the rim 48 of the cup. This split ring abuts the camming face 30 of the ring, and thereby limits the movement of the cup relatively in the ring, the opposite directional limit being determined by the limit of compression of the spring 42 between the seats 28, 30.

The wall 38 of the cup is provided with a plurality of radially extending ports or openings therethrough, herein shown as three in number, spaced 120° apart. Each of these openings 50 provides a seat for a ball 52, the diameters of which are substantially larger than the thickness of the wall 38. The inner edges of the openings 50 may be slightly peened to retain the balls 52 therein. The balls are subject to radial movement and are free to rotate in their respective seats 50. With the cup held at its outermost position through the action of the spring 40, the balls 52 will ride on the inner wall of the ring portion 26 and extend for a substantial distance into the cup interior, and thus provide a barrier for spherical knob 54 when nested in the seat 36, in that the diameter of the knob or head 54 is just slightly less than the diameter of the seat 36.

However, when the cup is fully telescoped into the ring, the balls 52 will ride onto the cammed region 30. Such camming region being tapered outwardly, the balls may be rolled or forced outwardly in their seats 50 to such an extent that the head 54 may be entirely withdrawn from the cup, or such knob may be easily moved into the cup, and when the balls are rolled inwardly, they lock the knob therein. Such balls provide a bearing for the knob 54 to roll thereon in a universal manner and yet be securely retained within the cup.

The extension 34 from the cup may project through the draw bar 10 and when mounted thereon, nut 56 may securely lock the female hitch unit to this draw bar. The nut 56 is mounted on a portion of the stem 34, which may be threaded, and the nut can be loosened from the bar 10 and rotated to engage the inner side of the web 20, the nut being used to force the cup 36 against the resistance of spring 40.

With the nut 36 released from the bar 10, the stem 34 extending through and beyond the web 20 may be manually engaged to also force the cup 36 against the resistance of the spring 40 to thereby manually release the head 54, or set the parts to readily receive such head. Means are provided to provide unintentional shifting of the stem 34 sufficiently to unlock the parts, and to this end the upper terminus of the stem 34 is diametrically ported to receive pin 58, which in turn may have a frictional snap connection 60 built into the stem 34. A keeper chain 62 attached to the pin 58 may have its remote end attached to bracket 64 mounted on one of the yoke legs 18. This is an added safety feature against loss of parts.

The ring yoke and cup, together with parts attached thereto, comprise the female unit of the coupling and is herein described as mounted on the draw bar 10. The head or knob 54 on the other hand may be an integral portion of threaded stem 66, which in turn may extend through the draw bar 12 and be locked thereto by a nut 68 to provide the male unit. The head 54 is fixed to the draw bar 12 and the cup-containing unit may be lowered thereover, and the spring 40 allowed to shift the cup longitudinally from the ring as far as permitted by the stop means 44. This causes the balls 52 to engage the ring portion 26, and thereby extend well into the cup, thereby locking the head 54 therein. The pin 58 may then be snapped through the stem 34, and a secure interlock is obtained.

In coupling or uncoupling units one from another, it is only necessary to pull the pin 58 from the stem 34, release nut 56, and press the stem 34 toward the ring 14. If, due to weathering or posible corrosion and sticking of the parts, the parts are difficult to operate, then the nut 56 may be used as a jack to force the cup 32 into the ring, thereby moving the balls 52 into the camming region 30, which is of a greater diameter than the portion 26, permitting the balls to release the post carried head 54, for the unit sections to be readily separated.

While the yoke is shown here as mounted on the draw bar 10, and the head 54 mounted on the draw bar 12, it is obvious these may be reversed, and the coupling readily operated with the parts having their axis horizontally disposed instead of vertically, as herein shown.

A flexible ring 70 may be strategically mounted on the head member fitting to serve as a dust guard for the inner parts particularly when the major portions are coupled.

All the parts herein are simple castings or machined parts, so that the substantial coupling is one which may be built in various sizes, yet economical, and at the same time have a positive interlock, yet permitting a low friction universal movement therebetween, even when an articulated train may be coupled thereby, and such train be speedily drawn along a winding path.

It is to be understood that the above description of the present invention is intended to disclose an embodiment thereof to those skilled in the art, but that the invention is not to be construed as limited in its application to the details of construction and arrangement of parts illustrated in the accompanying drawings, since the invention is capable of being practiced and carried out in various ways without departing from the spirit of the invention. The language used in the specification relating to the operation and function of the elements of the invention is employed for purposes of description and not of limitation, and it is not intended to limit the scope of the following claims beyond the requirements of the prior art.

What is claimed and desired to secure by United States Letters Patent:

1. A coupling device of the class described including a spherical knob attached to one base, a unit to embrace said knob attached to another base, said unit embodying a frame comprising a ring-shaped part, a U-shaped part having its legs attached to opposing sides of said ring part, said U-shaped part provided with a leg connecting web and having a bearing providing aperture therethrough in substantial coaxial alignment with said ring part, a cup-shaped member coaxially disposed within the ring part and axially reciprocable therein, said cup-shaped member having an extension through said bearing aperture, means mounted in and extending through the cup-shaped member's wall to engage said ring part and having portions extending into said cup adjacent the entrance thereinto, said latter portions providing a barrier to hold said knob within the cup when said knob is embraced by said unit.

2. The structure set forth in claim 1 wherein said cup-shaped member embodies means limiting its axial movement relatively with said ring.

3. The structure set forth in claim 2 wherein said movement limiting means includes a split-ring engaging a groove about the outer surface of said cup adjacent its rim.

4. The structure set forth in claim 1 wherein spring means coact between said cup-shaped member and ring part normally urging said cup-shaped member in one direction within said ring part.

5. The structure set forth in claim 1 wherein said cup-shaped member is provided with a seat about its outer periphery and the ring part is provided with an opposing seat about its inner periphery, and a compression spring about said cup-shaped member coacting between said seats.

6. The structure set forth in claim 1 wherein said cup extension is provided with a threaded portion, and a nut on said threaded portion adjustable to engage the web of said U-shaped element.

7. The structure set forth in claim 1 wherein said cup extension is diametrically ported adjacent the web, and a pin insertible through said ported portion to provide a stop limiting axial movement of said extension relatively to said web.

8. The structure set forth in claim 7 wherein said extension is provided with friction holding means for said pin.

References Cited in the file of this patent

UNITED STATES PATENTS

| | | |
|---|---|---|
| 1,516,257 | White | Nov. 18, 1924 |
| 2,265,850 | Martin | Dec. 9, 1941 |
| 2,395,534 | Cook | Feb. 26, 1946 |
| 2,472,392 | Alexander | June 7, 1949 |
| 2,498,776 | Weiss | Feb. 28, 1950 |
| 2,634,987 | Palmer | Apr. 14, 1953 |
| 2,696,392 | Case | Dec. 7, 1954 |